Nov. 19, 1929.    F. M. EDGAR ET AL    1,735,897
HANDLE ASSEMBLY
Filed May 6, 1926
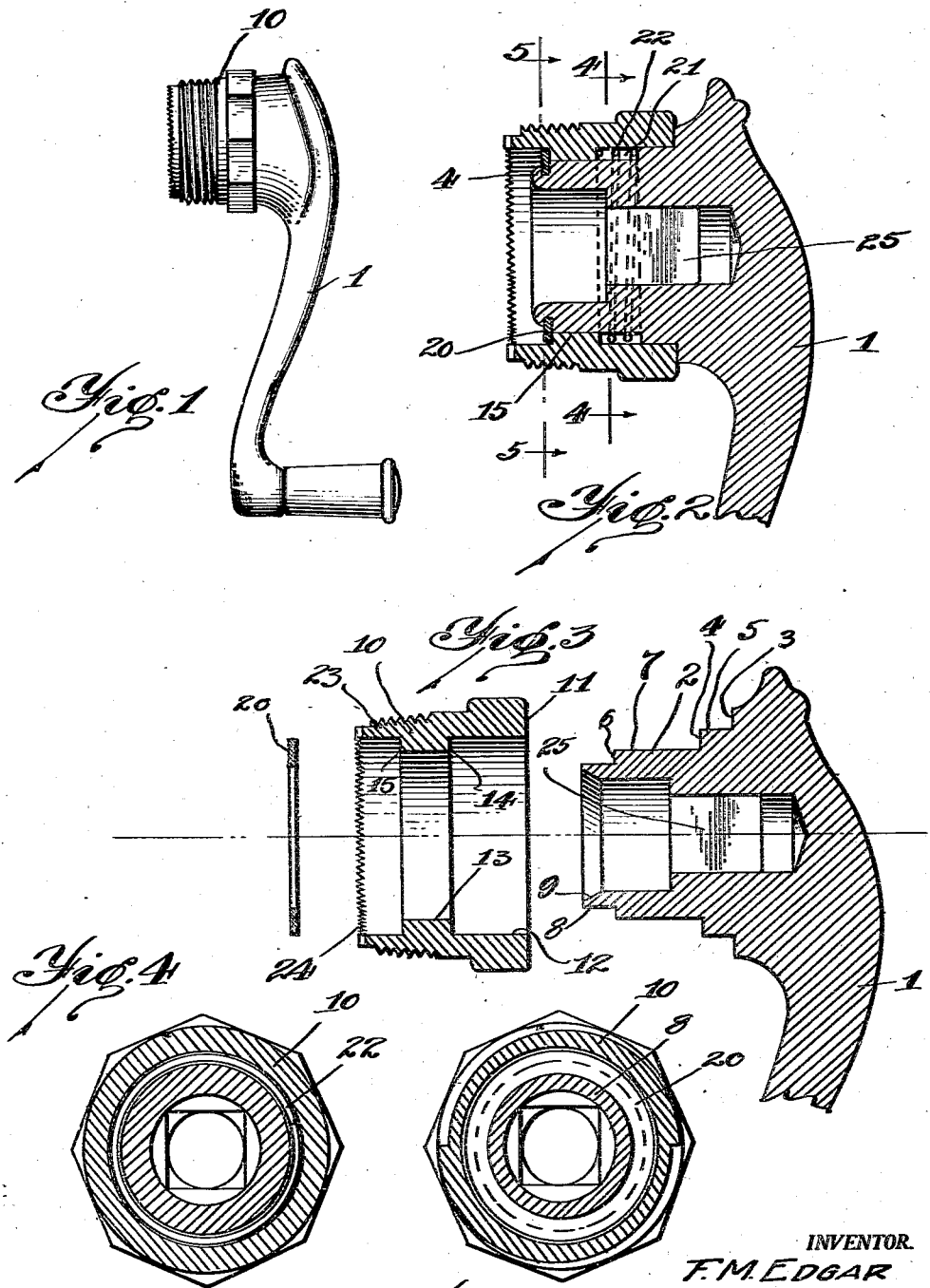
INVENTOR.
F. M. EDGAR
T. P. ARCHER
BY
ATTORNEY.

Patented Nov. 19, 1929

1,735,897

UNITED STATES PATENT OFFICE

FRANK M. EDGAR AND THOMAS P. ARCHER, OF DETROIT, MICHIGAN, ASSIGNORS TO TERNSTEDT MANUFACTURING COMPANY, OF DETROIT, MICHIGAN, A CORPORATION OF MICHIGAN

HANDLE ASSEMBLY

Application filed May 6, 1926. Serial No. 107,179.

This invention relates to handle assemblies, and has to do particularly with such assemblies adapted for use in the operation and regulation of windows of automobiles.

In handle assemblies of the character referred to, a hand crank is ordinarily provided, and this crank has a hub which extends through the wall of the automobile body, and which is operatively connected to the window regulator mechanism. In order to hold the crank in position, a bushing is usually rotatably mounted upon the hub, and this bushing is fixed to the wall of the automobile body or to a stationary part of the regulator mechanism.

With such a construction it is desirable that the bushing and the hub be accurately fitted to insure proper rotative movement between the parts when the crank is turned, and at the same time the bushing must be securely fastened to the hub to prevent the crank from being pulled out of place. Also it is desirable that the hub and bushing be provided with accurate thrust bearings so that no binding occurs when the parts are assembled.

According to the invention, the hub and the bushing are constructed to provide spaced bearings, which permit rotative movement between the parts. The two parts are associated in such a way as to form a chamber between the two spaced bearings, and within this chamber an anti-rattle spring may be placed. The hub also presents a thrust bearing surface against which one end of the bushing abuts and both the bushing and the hub are constructed with shoulders which are spaced a predetermined distance from the thrust surface of the hub. A ring is fitted against the two shoulders when the parts are put together, and the ring is then securely held in place, and it provides a thrust bearing in opposition to the thrust bearing surface of the hub, and at the same time serves to hold the parts together. The construction is such that when the parts are assembled the thrust bearings are in accurate adjustment and no binding of the parts occur.

This novel construction in which the bearing surfaces between the hub and the bushing are spaced apart, insures proper rotative movement and prevents swinging movement of the hub relative to the bushing when the crank is turned by an operator. The anti-rattle spring is completely housed, and the space which lies between the spaced bearings is utilized for this purpose. The construction also affords thrust bearings between the two members, both of which are at right angles to the axis of the hub and which are in accurate adjustment when the parts are assembled. This accurate adjustment of the thrust bearings prevents any binding action between the hub and bushing.

For a better understanding of the invention, reference will be made to the accompanying drawings wherein Fig. 1 is a side elevation of the assembly.

Fig. 2 is an enlarged sectional view.

Fig. 3 is a sectional view of the parts in disassembled relation.

Fig. 4 is a section taken on the line 4—4 of Fig. 2.

Fig. 5 is a section taken on the line 5—5 of Fig. 2.

In these drawings a hand crank 1 of any desired construction is provided with a hub 2 projecting therefrom. This hub 2 is provided with a thrust bearing surface 3 and an offset portion providing a shoulder 4. Lying between the thrust bearing surface and the shoulder is a bearing surface 5. A second offset portion provides a shoulder 6, and a bearing surface 7 lies between the shoulder 6 and the shoulder 4. The innermost end 8 of the hub, which is of reduced diameter, may be beveled, as shown at 9.

A bushing or rose 10 is adapted to fit over the hub of the crank, and has one end provided with a thrust bearing surface 11 which abuts against the thrust bearing surface 3 of the hub. The interior of the bushing provides a bearing surface 12 which fits the bearing 5 of the hub when the bushing is in position. The interior of the bushing is provided with an annulus 13 which fits over the bearing surface 7 of the hub. The annulus 13 provides shoulders 14 and 15, and when the parts are in assembled relation the shoulder 14 is spaced from the shoulder 4 of the hub, and the shoulder 15 is in alignment with the shoulder 6 of the hub.

In order to hold the parts together, a ring 20 is placed over the reduced end 8 of the hub and within the inner end of the bushing. This ring abuts against the aligned shoulders 15 and 6, and the end of the hub is then turned outwardly (preferably by spinning), as shown in Fig. 2, over a portion of the ring and the parts are securely locked together.

Due to the fact that the spacing between the shoulder 15 and the bearing surface 11 of the bushing, and between the shoulders 6 and 3 of the hub, is predetermined, no binding occurs when the inner end of the hub is forced over. This permits the upsetting of the inner end of the hub with a considerable degree of pressure without affecting in any way the thrust bearing surfaces, with the result that when the parts are assembled the thrust bearings are automatically adjusted. The washer 20 may be of any desirable material of sufficient strength to retain the parts together and to provide suitable thrust bearing surface.

The bearing surface 5 of the hub which fits within the portion 12 of the bushing, is of less width than the portion 12 of the bushing, and a chamber 21 is thus provided between the shoulder 4 of the hub and the shoulder 14 of the bushing. Within this chamber an anti-rattle spring 22 is inserted during the assembling of the parts. The anti-rattle spring is thus completely housed and is positioned between the bearing surfaces between the hub and the bushing.

As shown in the drawings, the bushing may be provided with external threads 23 for the purpose of securing the same to a stationary part of the automobile body, or to a part of the window regulator mechanism, and the bushing may be also provided with a serrated end 24 which assists in preventing rotation of the bushing after the same has been threaded to position. Also the hub of the housing is shown as having a recess 25, which recess may be utilized for operatively connecting the hub to the regulator mechanism.

It will thus be seen that the invention provides a handle assembly wherein the bearings between the members are spaced and any swinging action which may result by reason of the operation of the handle is in a large measure prevented. Also the construction is such as to positively prevent the binding action between the parts when the inner end of the hub is turned over and the thrust bearing adjustment is assured regardless of varying pressures which may be encountered in the turning operation.

We claim:

1. A handle assembly, comprising the combination of a handle having a hub, a bushing fitting over the hub, the hub having a shoulder and the bushing having an annulus spaced interiorly from each end of the bushing and on its interior surface the shoulder and annulus being flat and in alignment when the bushing is in place, and a flat ring fitting over the end of the hub and abutting against the shoulder and annulus, the abutting surfaces of the ring and annulus being shaped to nicely fit each other, and means for holding the ring in position.

2. A handle assembly, comprising the combination of a handle having a hub, a bushing fitting over the hub, the hub and bushing having shoulders with plane surfaces extending perpendicularly to the axis of the hub and which are in alignment when the bushing is in place, and a flat ring fitting over the end of the hub and abutting against the shoulders and in non-rotative relation with the hub, the inner end of the hub being turned outwardly over a part of the ring to hold the parts in assembled relation.

3. A handle assembly, comprising the combination of a crank, a hub on the crank having an offset portion providing a shoulder and a reduced end, a bushing fitting over the hub and a retaining ring on the reduced end of the hub, the end of the hub being spun outwardly and tightly against the ring to hold the parts in assembled relation.

4. A handle assembly comprising the combination of a crank, a hub on the crank, a bushing rotatably mounted on the hub, the hub and the bushing being constructed to provide spaced bearing surfaces between the hub and bushing and with a chamber between the bearing surfaces, and an anti-rattle spring completely housed within the chamber.

5. A handle assembly, comprising the combination of a crank, a hub on the crank, a bushing rotatably mounted on the hub, the hub and the bushing being constructed to provide spaced bearing surfaces parallel to the axis of the hub, opposed thrust bearing surfaces on the hub for preventing lateral movement between the hub and bushing, these thrust bearing surfaces being perpendicular to the axis of the hub.

6. The method of rotatably mounting a hub of a handle in a bushing, the said hub having a thrust bearing surface, a shoulder spaced from the bearing surface, and a reduced end, and the bushing having a shoulder, which comprises placing the bushing over the hub until it abuts against the thrust bearing surface, sliding a ring over the reduced end of the hub, and then turning the reduced end of the hub outwardly to hold the ring in close engagement with the shoulders of the hub and the bushing.

7. The method of rotatably mounting a hub of a handle in a bushing, the said hub having a thrust bearing surface, a shoulder spaced from the bearing surface, and a feathered end, and the bushing having a shoulder, which comprises placing the bushing over the hub until it abuts the thrust bearing surface, sliding a ring over the feathered end of the hub, and then spinning this end of the hub over to hold the ring in close engagement with the shoulders of the hub and the bushing to hold the parts together.

8. A handle assembly comprising the combination of a crank, a hub on the crank having a shoulder, a bushing rotatably mounted on the hub and abutting against the shoulder, the end of the hub being turned over to hold the bushing on the hub, and thrust bearing surfaces on the hub and on the bushing in a pre-determined spaced relation so as to prevent binding of the bushing between the said shoulder and the turned over end of the hub regardless of varying pressures within manufacturing limits with which the same is turned over.

9. A handle assembly comprising the combination of a crank, a hub on the crank having a shoulder, a bushing rotatably mounted on the hub and abutting against the shoulder, the end of the hub being turned over to hold the bushing on the hub, a thrust member interposed between the bushing and the turned over end and in non-rotative relation with the hub, and the construction of the hub being such as to prevent binding of the bushing between the said shoulder and the said thrust member regardless of the pressure with which the end of the hub is turned over.

10. A handle assembly comprising in combination a crank, a hub on the crank which is offset to provide bearing surfaces having different diameters, a bushing rotatably mounted on the hub and being provided with interior bearing surfaces in different diameters corresponding to the bearing surfaces on the hub, the interior surface of smaller diameter being formed by an annulus which is spaced from the shoulder on the hub to form a chamber, and a compression spring on the hub acting on the hub offset and the bushing annulus, and means non-rotatably mounted on the hub for holding the bushing on the hub.

11. A handle assembly comprising a combination of a crank, a hub on the crank, a bushing rotatively mounted on the hub, the hub and the bushing being constructed so as to present spaced bearing surfaces parallel to the axis of the hub, and spaced thrust bearing surfaces perpendicular to the axis of the hub, and a washer spun on to the end of the hub and in fixed relation thereto whereby the hub and the bushing are provided with an accurate thrust bearing surface.

In testimony whereof we have affixed our signatures.

FRANK M. EDGAR.
THOMAS P. ARCHER.